Patented June 26, 1945

2,379,249

UNITED STATES PATENT OFFICE 2,379,249

HEAT TRANSFER MEDIUM

Irving E. Muskat, Glenside, Pa., assignor to Pittsburgh Plate Glass Company, Pittsburgh, Pa., a corporation of Pennsylvania No Drawing. Application November 25, 1942, Serial No. 466,952

5 Claims. (Cl. 252—73)

The present invention is directed to the transfer of heat by means of a heat transfer liquid. Prior to the present invention various high boiling compounds have been used in suitable heat transfer equipment for both heating and/or cooling purposes. Thus compounds such as ethylene glycol and diethylene glycol have been used as cooling liquids in the cooling system of an internal combustion engine and aryl compound such as diphenyl or diphenyl oxide have been used as heating liquids in evaporators or concentrators for the concentration of various solutions such as caustic soda solutions.

Considerable difficulty has been encountered in the use of heat transfer liquids due to the fact that many of them decompose under prolonged use. Moreover, others have been found to have an excessive viscosity at low temperatures. In accordance with the present invention I have found that the esters of (a) a polyhydric alcohol and (b) an acid ester of carbonic acid and a saturated alcohol are superior in heat stability, viscosity range and many other respects to many of the heat transfer liquids previously used and are especially valuable for this purpose. The compounds which are especially desirable for this purpose are the polyesters. However, monoesters may be used. Many of the esters herein contemplated have a chemical constitution as follows:

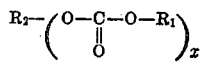

in which $R_2$ is an aliphatic hydrocarbon radical or a plurality of aliphatic hydrocarbon radicals separated by ether linkages, $R_1$ is a lower alkyl radical, and $x$ is a small whole number greater than one. In this case the $R_2$ radicals are preferably the radicals derived from the glycols such as ethylene, propylene, trimethylene, tetramethylene, etc., glycols, alpha methyl glycerol, glycerine, erythritol, or other polyhydric alcohol, the polyglycols such as di-, tri-, and tetraethylene glycols, di-, tri-, and tetrapropylene glycols, di-, tri-, and tetrabutylene glycols, polyglycerols, etc. The $R_1$ radicals may be derived from any of the monohydroxy saturated alcohols preferably short chained saturated aliphatic or aralkyl alcohols such as ethyl, methyl, n-propyl, benzyl, isopropyl, butyl, amyl, hexyl, cyclohexyl, tetrahydrofurfuryl, alcohols, etc., or the radicals may be derived from ethylene chlorhydrin, methyl, ethyl or other lower alkyl carbitols, or methyl, ethyl, or other lower alkyl cellosolves.

Of special importance are the carbonate esters in which $x$ has a value of two:

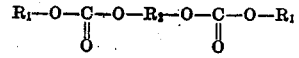

These compounds which may be designated as alkylene bis (alkyl carbonates) etc., are prepared by reacting dichloroformates of glycols or dichloroformates of polyglycols with saturated alcohols or by reacting chloroformates of saturated alcohols with glycols or polyglycols. Such methods are described and claimed in copending application for United States Letters Patent Serial No. 413,644, filed October 4, 1941, by Irving E. Muskat and Franklin Strain.

In addition to the above esters, partial esters or mixed esters may be used. For example the monoesters of (a) a polyhydric alcohol such as ethylene glycol or diethylene glycol and (b) an acid ester of carbonic acid and a saturated monohydric alcohol such as ethyl, amyl, cetyl, or hexyl alcohol may be used. Likewise mixed esters may be used, for example, those in which one hydroxy group of a glycol or polyglycol is esterified with an amyl acid carbonate while the other hydroxy group is esterified with methyl acid carbonate.

More specific examples of esters which provide satisfactory heat transfer media are ethylene glycol bis (methyl carbonate), ethylene glycol bis (ethyl carbonate), propylene glycol bis (methyl carbonate), diethylene glycol bis (butyl carbonate), and ethylene glycol (amyl carbonate) (methyl carbonate). Manifestly, however, other compounds of this type come within the scope of this invention.

The carbonate esters herein mentioned are peculiarly adapted for use as mediums of heat transmission. They have a low viscosity over a wide range of temperatures. In the normal use of these materials they are circulated through the heat exchanger or through the annular space in the block of the internal combustion engine. The liquid esters moving over the hot metal walls leave only a very thin layer to resist the transmission of heat. The coefficient of heat transfer is accordingly very favorable. Some of these esters are quite fluid at temperatures as low as —40° C. and —50° C. and all of them are liquids having surprisingly low viscosities over the wide temperature ranges such as are encountered in the operation of internal combustion engines.

This group of esters are also very stable liquids at high temperatures. At temperatures of 200° C. to 250° C. they generally manifest very slight vapor tensions amounting to only a few millimeters. At the same temperatures the esters are not subject to decomposition, polymerization or any other chemical reaction which would impair the utility as a heat transfer medium.

The above esters may be used as cooling liquids in the cooling systems of internal combustion engines including airplane and automobile engines. They may also be used for indirect heating of evaporators, concentrators, or other systems wherein heat exchange liquids are desired.

Although this invention has been described with respect to specific details of certain embodiments thereof it is not intended that these details shall constitute limitations on the scope of the invention except as included in the appended claims.

I claim:

1. In a process for transmitting heat by means of a heat transfer fluid the step which comprises employing a liquid ester of (a) an aliphatic polyhydric alcohol and (b) an acid ester of carbonic acid and a monohydric saturated alcohol as the heat transfer fluid.

2. In a process for transmitting heat by means of a heat transfer fluid the step which comprises employing a liquid ester of (a) a polyhydric compound of the group consisting of glycols and polyglycols and (b) an acid ester of carbonic acid and a lower monohydric saturated alcohol as the heat transfer fluid.

3. In a process for transmitting heat by means of a heat transfer fluid the step which comprises employing a liquid diester of (a) a polyhydric compound of the group consisting of glycols and polyglycols and (b) an acid ester of carbonic acid and a lower monohydric saturated alcohol as the heat transfer fluid.

4. The process of claim 3 in which the polyhydric compound is ethylene glycol.

5. The process of claim 3 in which the polyhydric compound is a polyethylene glycol.

IRVING E. MUSKAT.